(12) United States Patent
Hayashi

(10) Patent No.: US 9,430,950 B2
(45) Date of Patent: Aug. 30, 2016

(54) TRANSPORTATION VEHICLE SYSTEM AND CHARGING METHOD FOR THE TRANSPORTATION VEHICLE SYSTEM

(71) Applicant: MURATA MACHINERY, LTD., Kyoto-shi, Kyoto (JP)

(72) Inventor: Takao Hayashi, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 350 days.

(21) Appl. No.: 14/101,069

(22) Filed: Dec. 9, 2013

(65) Prior Publication Data
US 2014/0172196 A1 Jun. 19, 2014

Related U.S. Application Data

(62) Division of application No. 13/156,885, filed on Jun. 9, 2011, now abandoned.

(30) Foreign Application Priority Data

Aug. 9, 2010 (JP) .................................. 2010178463

(51) Int. Cl.
*G08G 9/00* (2006.01)
*B60L 11/18* (2006.01)

(52) U.S. Cl.
CPC .............. *G08G 9/00* (2013.01); *B60L 11/1824* (2013.01); *B60L 11/1838* (2013.01); *B60L 11/1846* (2013.01); *B60L 11/1861* (2013.01); *B60L 2200/26* (2013.01); *Y02T 10/7005* (2013.01);
(Continued)

(58) Field of Classification Search
CPC ............ B60L 11/1837; B60L 11/1824; B60L 11/1838; B60L 11/1846; B60L 11/1861; B60L 2200/26; Y02T 10/7005; Y02T 90/14; Y02T 90/16; Y02T 90/163; Y02T 90/169; G08G 9/00
USPC ......................................................... 320/109
See application file for complete search history.

(56) References Cited

U.S. PATENT DOCUMENTS 5,220,263 A * 6/1993 Onishi ............. G05B 19/41895
180/168
5,594,318 A * 1/1997 Nor ..................... B60L 11/1816
320/108

(Continued)

FOREIGN PATENT DOCUMENTS

JP 05-207611 8/1993
JP 10-320048 12/1998

(Continued)

*Primary Examiner* — Jason C Smith
(74) *Attorney, Agent, or Firm* — DLA Piper LLP (US)

(57) ABSTRACT

A plurality of transportation vehicles travel with power from an energy storage member along a predetermined travel route under control of a ground controller. A charging area having charging equipment for charging the energy storage member of the transportation vehicle is provided in the travel route, and the transportation vehicles report a position and remaining capacity of the energy storage member to the ground controller. The ground controller controls a transportation vehicle having remaining capacity of a threshold value or less to travel to the charging area for charging the energy storage member, and controls transportation vehicles in the charging area to travel to positions outside the charging area in accordance with transportation requests.

6 Claims, 6 Drawing Sheets

(52) U.S. Cl.
CPC ........... *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2002/0124906 | A1* | 9/2002 | Suzuki | H01L 21/67017 141/98 |
| 2005/0150416 | A1* | 7/2005 | Hori | B60L 23/005 105/49 |
| 2005/0221840 | A1* | 10/2005 | Yamamoto | G05D 1/0242 455/456.3 |
| 2005/0235865 | A1* | 10/2005 | Kumar | B60L 9/16 105/61 |
| 2008/0147306 | A1* | 6/2008 | Hayashi | G08G 1/042 701/117 |
| 2009/0138149 | A1* | 5/2009 | Chattot | B60L 1/003 701/22 |
| 2009/0208313 | A1* | 8/2009 | Hayashi | G06Q 10/08 414/222.02 |
| 2010/0228389 | A1* | 9/2010 | Hayashi | G05D 1/0212 700/229 |
| 2011/0251735 | A1* | 10/2011 | Hayashi | B60L 27/0094 701/2 |
| 2012/0032668 | A1* | 2/2012 | Hayashi | B60L 11/1824 324/207.24 |

FOREIGN PATENT DOCUMENTS

| | | |
|---|---|---|
| JP | 2010-092321 | 4/2010 |
| TW | M379529 U1 | 5/2010 |

* cited by examiner

TRANSPORTATION VEHICLE SYSTEM AND CHARGING METHOD FOR THE TRANSPORTATION VEHICLE SYSTEM

BACKGROUND OF THE INVENTION

1. Field of the Invention

The present invention relates to a transportation vehicle system, in particular, to a system of transportation vehicles that travel using secondary batteries.

2. Description of the Related Art

Rechargeable secondary batteries are mounted on overhead traveling vehicles, rail guided vehicles, automated transportation vehicles or the like as the power supplies on the vehicles. In this regard, Patent Publication 1 (JPH05-207611A) proposes to provide a battery replacement machine for replacing batteries of the overhead traveling vehicles. For the transportation vehicle system using the second batteries, a system that controls reliably the state of charge (remaining capacity) of the battery and minimizes the loss time due to charging of the transportation vehicles is required.

SUMMARY OF THE INVENTION

An object of the present invention is to provide a system in which charging of transportation vehicles is performed efficiently.

The transportation vehicle system according to the invention makes a plurality of transportation vehicles having an energy storage member as a power supply run under control of a ground controller along a predetermined travel route;

said system is characterized in that a charging area having charging equipment for the energy storage member of the transportation vehicles is provided in the travel route, that the transportation vehicles have means for reporting positions and remaining capacities to the ground controller, and that the ground controller has a charge control unit controlling the transportation vehicles having the remaining capacities of the energy storage member not more than a threshold value to travel to the charging area for charging the energy storage members, and a vehicle placement control unit for controlling the transportation vehicles in the charging area to travel to positions outside the charging area.

In the present invention, when the remaining capacity of a energy storage member becomes a threshold value or less, charging is performed in the charging area, and the transportation vehicle is allocated to travel to the outside of the charging area in accordance with a transportation instruction or the like. The charging equipment is locally provided in the charging area, and is used as a charging space and a waiting space for the transportation vehicles. In this manner, the remaining capacity and waiting of the transportation vehicles are controlled in an integrated manner.

Preferably, the charge control unit makes the threshold larger for the transportation vehicles remote from the charging area and makes the threshold smaller for the transportation vehicles near from the charging area. In this manner, no shortage of electricity occurs in the battery, and no traffic jams occur since there are no traveling vehicles that travel at low speed due to shortage of electricity.

Preferably, the energy storage member comprises a secondary battery comprising single cells or cell units connected in series, the transportation vehicles are overhead traveling vehicles, configured to report electromotive forces and internal resistances of each single cell or each cell unit, and amounts of charge and discharge and the remaining capacity of the secondary battery to the ground controller, and the ground controller detects an overhead traveling vehicle having a secondary battery that requires maintenance. It is preferable to report temperature of the single cell or the cell unit in addition to electromotive force and internal resistance. The remaining capacity herein means the remaining capacity of the entire secondary cell, or the remaining capacity of each single cell or each cell unit. When the overhead traveling vehicle reports electromotive force and internal resistance for each of the single cells during charging or discharging, abnormal single cells or cell units are detected, if any. Further, by reporting the amount of changes in the remaining capacity of the secondary battery, single cell, or cell unit relative to the amount of charged electricity or the amount of discharged electricity, the degradation and the degree of the degradation of the secondary batteries are detected. Therefore, the overhead traveling vehicle having the secondary battery that requires maintenance is detected reliably.

Preferably, the charging equipment comprises non-contact electricity feeding lines and power supplies for the non-contact feeding lines, in particular, feeding lines having large electricity feeding capacity for rapid charging and power supplies thereof. They are provided in the charging area and in straight segments in the travel route outside the charging area. The overhead traveling vehicles are configured to charge the secondary battery in the charging area when the remaining capacity of the secondary battery is the threshold value or less, and charge the secondary battery in the straight segments outside the charging area when the remaining capacity of the secondary battery is the threshold value or more. When rapid charging is performed through the non-contact electricity feeding lines, the battery is charged without the overhead traveling vehicles stopping, and therefore, the overhead traveling vehicles may charge at any position in the charging area. Further, charging in segments outside the charging area, where non-contact electricity feeding lines are provided, supplements charging in the charging area, and allows the traveling vehicles to travel to the charging area when the battery capacity becomes abnormally low. In the charging area, the battery is fully charged during a long period of time until when allocation of the vehicle becomes necessary, e.g., until the remaining capacity becomes 100%. In contrast, the battery is charged outside the charging area to the extent that traffic jams may be avoided. With the remaining capacity equal or less than the threshold value, the battery is charged in the charging area, and the battery is further charged outside the charging area, with the remaining capacity larger than the threshold value. When the remaining capacity of the overhead traveling vehicle is high, charging of the battery of the overhead traveling vehicle may not be performed outside the charging area.

Preferably, the overhead traveling vehicles have means for charging the secondary battery with regenerative electricity from a travel motor. Charging the secondary battery with regenerative electricity from the motor of the overhead traveling vehicle keeps the remaining capacity of the secondary battery slower and reduces the frequency of charge.

Preferably, the ground controller reduces the threshold value when occurrence frequency of transportation instructions is relatively high, and increase the threshold value when occurrence frequency of transportation instructions is relatively low. By reducing the threshold value for charging in the charging area when occurrence frequency of transportation instructions is high, and increasing the threshold value for charging in the charging area when occurrence frequency of transportation instructions is low, charging is performed during a period when smaller number of transportation instructions are present, prior to the period when larger number of transportation instructions are present.

DETAILED DESCRIPTION OF THE PREFERRED EMBODIMENTS

Figure 1:
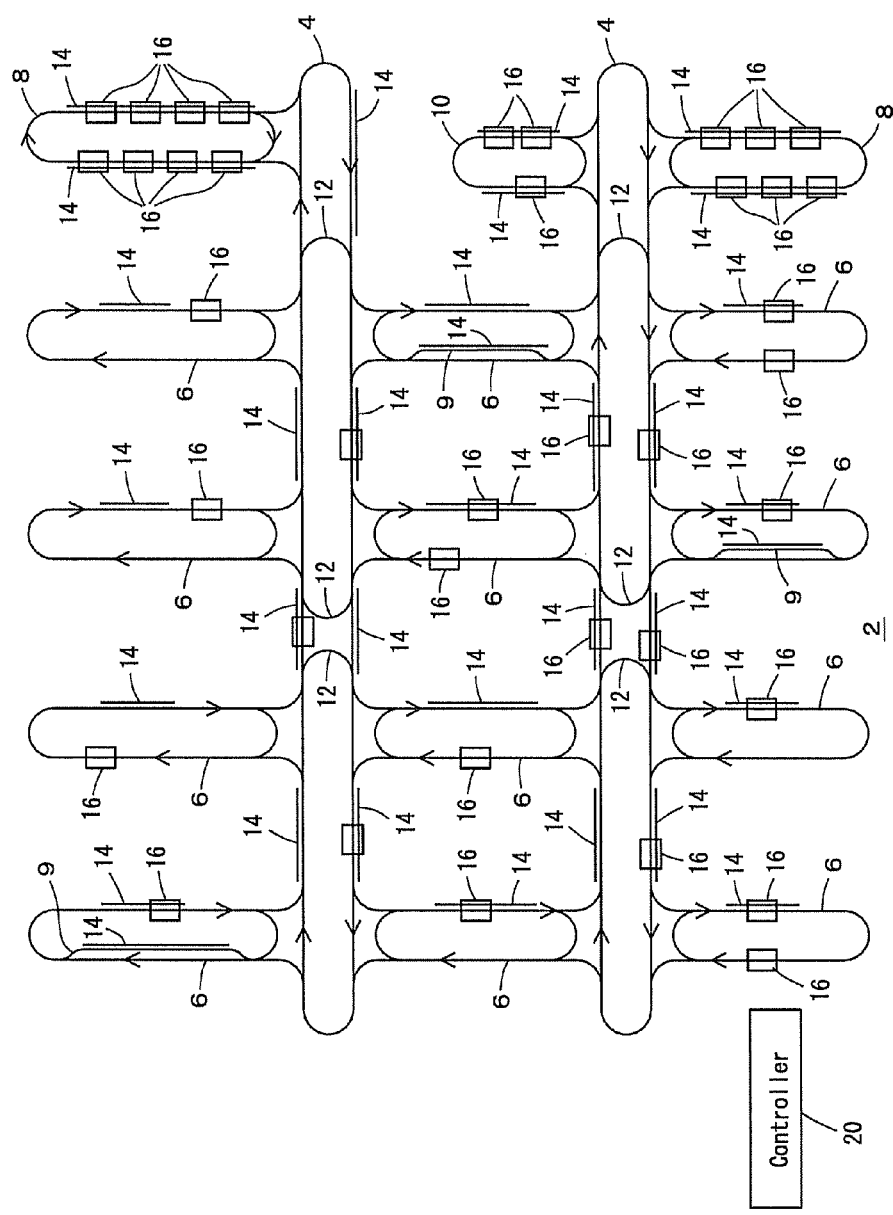
FIG. 1 A plan view showing a layout of an overhead traveling vehicle system according to an embodiment FIG. 2 A block diagram showing an overhead traveling vehicle in the embodiment FIG. 3 A block diagram showing a ground controller in the embodiment FIG. 4 A block diagram showing control of a secondary battery in the embodiment FIG. 5 A graph showing a charging rule in the embodiment FIG. 6 A diagram showing an algorithm for controlling battery life in the embodiment FIG. 7 A plan view showing a layout of an overhead traveling vehicle system in a modified embodiment

Hereinafter, the best embodiment for carrying out the present invention will be described. The scope of the invention shall be determined according to understanding of a person skilled in the art, based on the claims, in consideration of the description of the specification, and well known art in this technical field.

FIGS. 1 to 6 show an overhead traveling vehicle system 2 according to the embodiment, and the present invention is applicable to a rail guided vehicle system on the ground, and non-rail automated transportation vehicle system. In the drawings, reference numerals 4 denote inter-bay routes, reference numerals 6 denote intra-bay routes, reference numerals 8 denote charging bay routes, and a reference numeral 10 denotes a maintenance bay route. Reference numerals 12 denote shortcuts provided, for example, in the routes 4, 6. The intra-bay routes 6,6 are connected by inter-bay routes 4, and the overhead traveling vehicles may travel along all of the routes 4 to 10. The charging bay route 8 may serve also as the maintenance bay route 10. Further, the inter-bay route 4, the intra-bay route 6, or the like may include a route 9 dedicated for charging and retraction that has non-contact electricity feeding line 14 for allowing rapid charging along the route 9. The routes 9 is provided, for example, in parallel with the route 4 or the route 6, diverges from the route 4, 6 at the entrance, and merges with the route 4, 6 at the exit. Importantly, the routes 8 and 9 are dedicated for charging and retraction, and transportation instructions are not obstructed even if the routes 8, 9 are occupied by the overhead traveling vehicles 16 for a long period of time. It is sufficient to provide one of the charging bay route 8 and the dedicated route 9, and in the embodiment, it is assumed that the charging bay route 8 is provided.

The charging bay route 8 is a route for charging secondary batteries of the overhead traveling vehicles 16 and is used as a space for the overhead traveling vehicles to wait before allocation of vehicles. Except curve segments, diverging points, and merging points where reception of electricity is difficult, the non-contact electricity feeding line 14 for rapid charging is provided in the travel route. By the way, the non-contact electricity feeding line 14 may be provided also in the curve segment or the like. The maintenance bay route 10 is a route for performing maintenance operation of the overhead traveling vehicles 16, and the non-contact electricity feeding line 14 for rapid charging is provided in part of the maintenance bay route 10 for allowing charging during a period in which the overhead traveling vehicle 16 waits for maintenance or during test traveling after the maintenance. No non-contact electricity feeding lines 14 are provided at lifters for elevating and lowering the overhead traveling vehicles 16, in areas for workers to perform maintenance operation for the overhead traveling vehicles 16, in curve segments, nor at diverging points and merging points. The non-contact electricity feeding lines 14 are provided in straight segments of the routes 4, 6 in addition to the routes 8, 10 for rapidly charging the secondary batteries of the overhead traveling vehicles 16. Capacitors may be used in place of the secondary batteries, and lithium ion secondary batteries are preferable as the secondary batteries.

A reference numeral 20 denotes a ground controller that communicates with the overhead traveling vehicles 16, instructs to charge at the charging bay rout 8, to run to the maintenance bay route 10, to charge in the straight segments other than the charging bay route 8, and to run and wait in the routes 4, 6. The overhead traveling vehicle 16 travels along the routes 4, 6, charging from the non-contact electricity feeding line 14 in the straight segments, and charging the secondary batteries, at the time of deceleration, with regenerative electricity from motors such as travel motors or elevation motors for transfer of articles. When the remaining capacity of the secondary battery is decreased to a predetermined threshold value or less, with an instruction from the controller 20, the overhead traveling vehicle 16 travels to the charging bay route 8, and charges the secondary battery. If a failure occurs in the secondary battery, or any other trouble occurs, and at the time of performing a periodical diagnosis, with an instruction from the controller 20, the overhead traveling vehicle 16 travels to the maintenance bay route 10, and maintenance operation for the overhead traveling vehicle 16 is performed.

Figure 2:
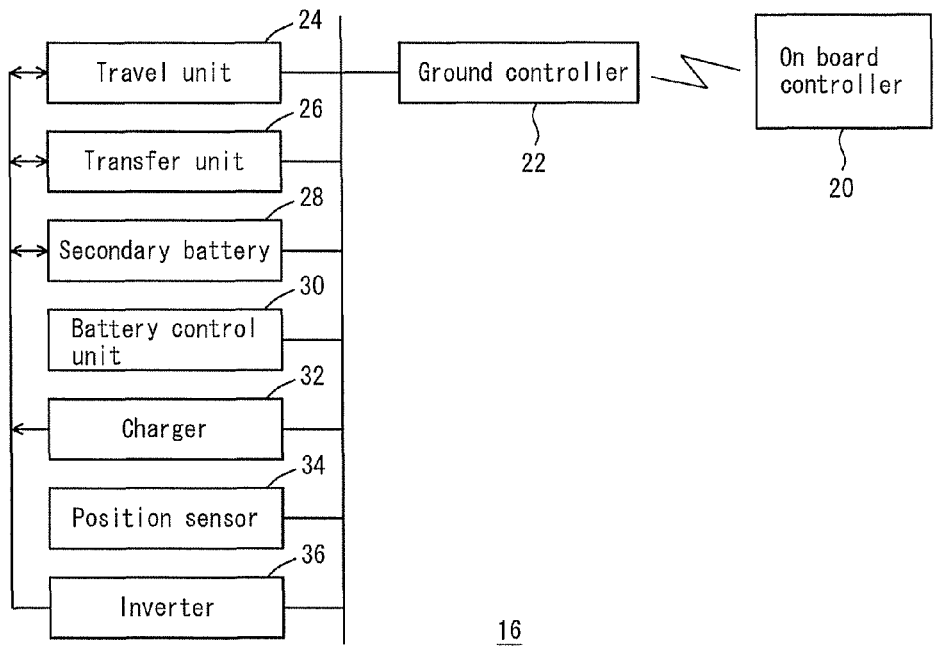

FIG. 2 shows structure of the overhead traveling vehicle 16. An on board controller 22 communicates with the ground controller 20 and implements overall control of the overhead traveling vehicle 16. The overhead traveling vehicle 16 travels along the travel rail provided in an overhead space by a travel unit 24 having a travel motor or the like. A transfer unit 26 of the overhead traveling vehicle 16 transfers articles to or from load ports, buffers, stockers or the like (not shown), e.g., by lateral movement of an elevation drive unit (not shown), rotation of the elevation drive unit about a vertical axis, elevation of an elevation frame by the elevation drive unit, and opening and closing of chucks provided on the elevation frame. Regenerative electricity of the travel unit 24 and the transfer unit 26 is used to charge the secondary battery 28. For example, the secondary battery 28 is a lithium ion secondary battery, but may be a nickel hydrogen battery or the like. It is charged from the non-contact electricity feeding line 14 through a charger 32 and an inverter 36, drives the travel unit 24 and the transfer unit 26 through the inverter 36, and is charged with the regenerative electricity. A position sensor 34 detects a position of the overhead traveling vehicle 16 along the routes 4 to 10, and the travel unit 24 and the transfer unit 26 control the travel and the transfer based on the position data.

A battery control unit 30 controls a state of the secondary battery 28. The secondary battery 28 comprises single cells or cell units connected in series; the cell unit comprises single cells in series. For example, electromotive force, internal resistance, and temperature are measured for each of the single cells or each of the cell units. The internal resistance can be measured based on the change in each voltage when the load is turned on or turned off, or charging is turned on or turned off. Further, the total voltage of the single cells or the cell units connected in series is regarded as the output voltage of the secondary battery 28. The battery control unit 30 monitors the output voltage of the entire secondary battery 28 or the output voltage of each cell unit, in addition to the states (electromotive force, internal resistance, temperature). Further, at the time of charging the secondary battery or discharging the secondary battery, the integrated value of charging electrical current and the integrated value of discharging electrical current are stored. Then, the changes in the states of each single cell or cell unit associated with the integrated values are stored. The output voltage of the secondary battery may be monitored as voltage of the entire battery or as voltages of cell units to be added. The temperature of each single cell or cell unit, or of the entire secondary battery may be monitored.

In most cases, troubles in the secondary battery 28 are not caused in the entire battery, but caused in any of single cells or cell units. The single cell or the cell unit having such a trouble is inspected in the maintenance bay route 10, and replacement or the like is performed. For this purpose, it is identified which single cell or the cell unit requires maintenance. In the single cell having a problem, some signs may be found. For example, electromotive force becomes lower, internal resistance is increased, temperature is increased, or capacity is reduced. The remaining capacity of the secondary battery 28 (ratio between the actual capacity and the capacity when the secondary battery is charged to the maximum level) can be estimated from the output voltage or electromotive force, internal resistance, temperature, and the integrated value of the charged current and the integrated value of the discharged current in the past. The capacity (maximum capacity) when the secondary battery is charged to the maximum level can be estimated from information as to how the remaining capacity has been changed relative to the integrated value of the charging electrical current or the integrated value of the discharging electrical current. That is, when the maximum capacity becomes low, the change in the remaining capacity relative to the charged electricity or the discharged electricity becomes large, and thus, the remaining capacity may be determined from the change in the electromotive force, the change in the internal resistance or the like. Instead of integrating the charging electrical current or the discharging electrical current, the charging time can be used on assumption that charging and discharging are performed using electrical current at a constant level.

Figure 3:
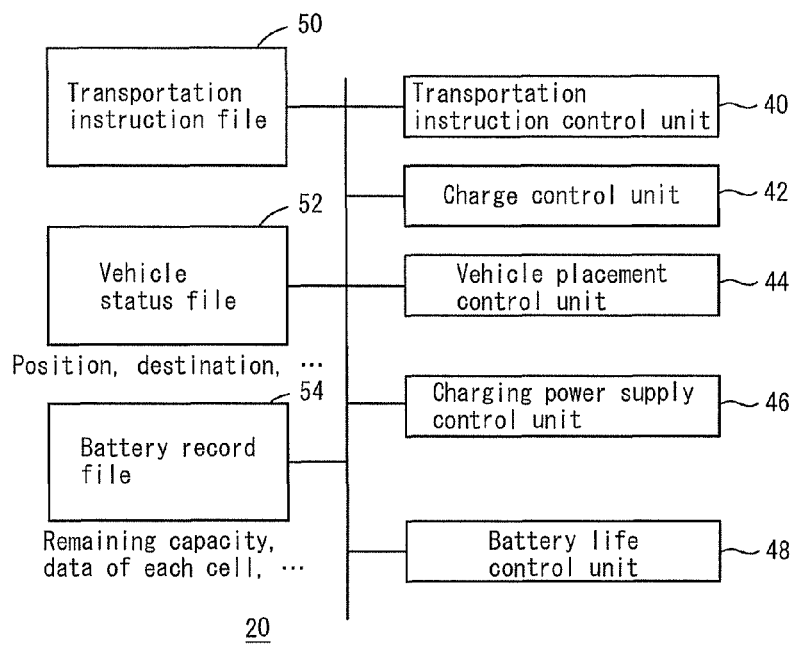

FIG. 3 shows structure of the ground controller 20. A transportation instruction control unit 40 allocates transportation instructions to the overhead traveling vehicles 16 in response to transportation requests from a host controller (not shown), and controls executions of the transportation instructions. A charge control unit 42 controls remaining capacity of the secondary battery 28 for each of the overhead traveling vehicles 16. When the remaining capacity of the secondary battery 28 is a predetermined threshold value P1 or less, the charge control unit 42 provides an instruction to the overhead traveling vehicle 16 to travel to the charging bay route 8 for charging the secondary battery 28. When the remaining capacity of the secondary battery 28 is a predetermine threshold value P2 or less, the charge control unit 42 instructs charging of the secondary battery 28 from the non-contact electricity feeding lines 14 provided in straight segments of the routes 4, 6. It should be noted that the threshold value P1 is, e.g., about 20 to 40%, and the threshold value P2 is, e.g., about 30 to 60%. The threshold value P2 is larger than the threshold value P1. Preferably, the threshold value P1 gets larger in a direction away from the charging bay route 8, and the threshold value P2 gets smaller in a direction toward the charging bay route 8. Charging may be performed all the time if the threshold value P2 is 100%, and there is any non-contact electricity feeding line 14 facing the routes 4 and 6.

A vehicle placement control unit 44 allocates the overhead traveling vehicles 16 from the charging bay route 8 to travel to the routes 4, 6, for assigning instructions to the overhead traveling vehicles 16. For example, with allocation of the overhead traveling vehicles 16 which entered the charging bay route 8 first, the overhead traveling vehicle 16 charged to the greatest extent is preferentially allocated. When the charging bay route 8 is a circulation route as shown in FIG. 1, the overhead traveling vehicles 16 having the remaining capacity of a predetermined value or more may be allocated to a designated position. Though the target remaining capacity in the charging bay route 8 is 100%, the overhead traveling vehicle 16 having the remaining capacity of less than 100% may be allocated as necessary. A charging power supply control unit 46 controls the power supply for the non-contact electricity feeding lines 14, in particular, such that electricity is supplied to the non-contact electricity feeding lines 14 in the routes 4, 6, only when the overhead traveling vehicle 16 travels and receives the charge.

A battery life control unit 48 monitors the life of the secondary battery. The battery control unit 30 of the overhead traveling vehicle 16 measures electromotive force, internal resistance, and temperature of each of the single cells or each of the cell units, and determines the relationship between the remaining capacity and the amount of charged electricity and the amount of discharged electricity. These items of data are inputted into the battery life control unit 48 through the on board controller 22 or the like to identify which single cell or cell unit requires maintenance. Further, for example, based on the change in the maximum capacity of the entire secondary battery, the remaining battery life is detected. Only one of the amount of charged electricity and the amount of discharged electricity may be monitored instead of being monitored both of the amount of charged electricity and the amount of discharged electricity. In this manner, necessity of maintenance is determined for each of the single cells or for each of the cell units of the secondary battery, or for the entire secondary battery. Based on these items of data, the battery life control unit 48 instructs the overhead traveling vehicle having the secondary battery that requires maintenance to travel to the maintenance bay route 10.

Transportation instructions and information regarding executions of the transportation instructions are stored in a transportation instruction file 50 of the ground controller 20. Current positions, velocities, destinations, presence or absence of assigned transportation instructions, and other vehicle information for the overhead traveling vehicles 16 are stored in a vehicle status file 52. Records of changes in electromotive force, internal resistance, temperature, and records of changes in the amount of charged electricity and the amount of discharged electricity, and remaining capacity or the like of each single cell or cell unit are stored in a battery record file 54. These items of data are part of vehicle information of the overhead traveling vehicles 16, and may be stored in the vehicle status file 52.

Figure 4:
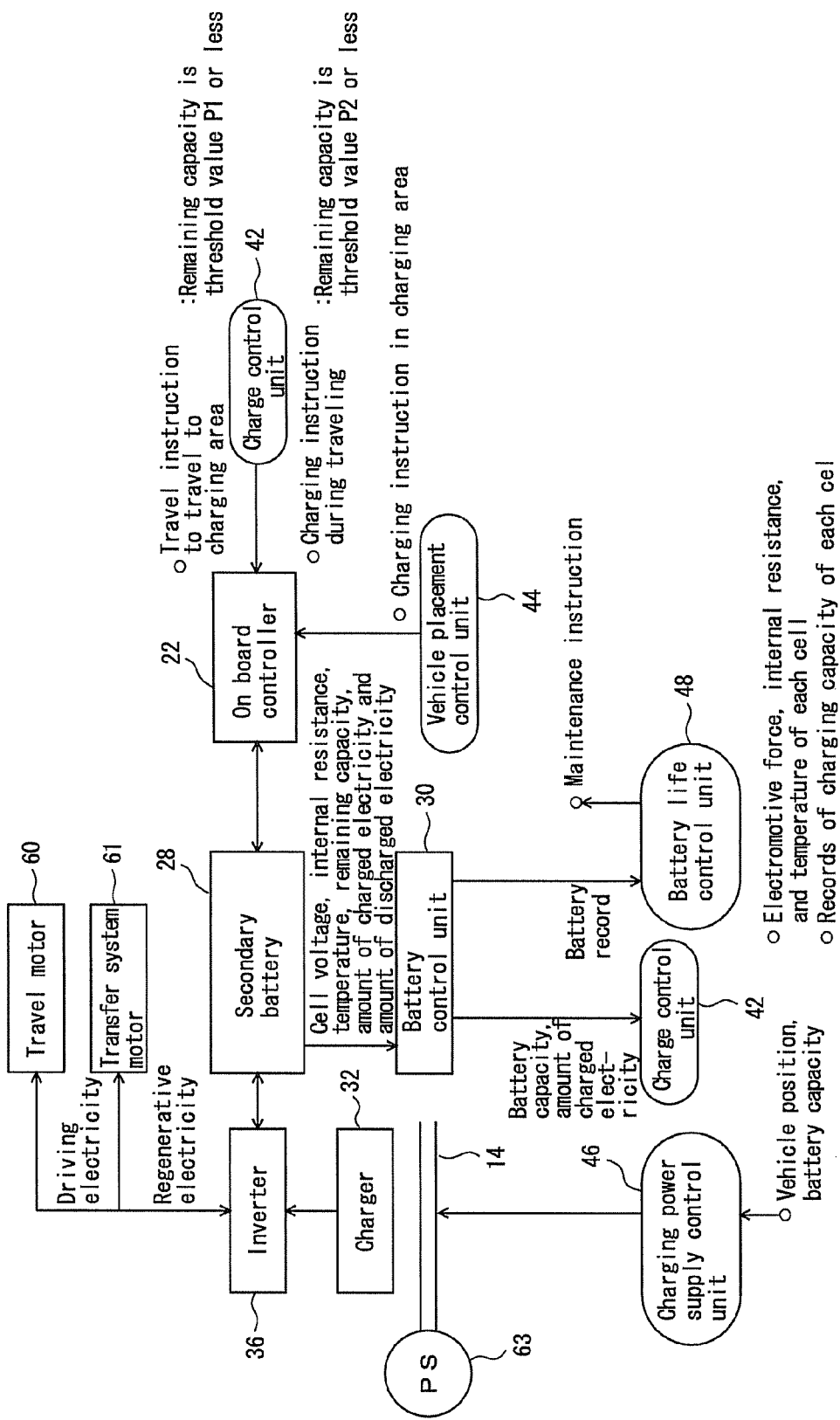

FIG. 4 shows the secondary battery 28 and a manner of controlling the secondary battery 28. Charging from the non-contact electricity feeding line 14 to the secondary battery 28 is performed by an inverter 36 and a charger 32. A reference numeral 63 denotes a high frequency power supply for supplying electricity to the non-contact electricity feeding line 14. By the output from the secondary battery 28, or in each segment where the non-contact electricity feeding line 14 is present, by electricity from the electricity feeding line 14, the inverter 36 drives the travel motor 60 and the motor 61 in the transfer system such as an elevation motor, and charges regenerative electricity therefrom to the secondary battery 28. The battery control unit 30 controls the remaining capacity, and the amount of charged electricity and the amount of discharged electricity or the like in the entire secondary battery 28, and reports these items of information to the charge control unit 42 and the battery life control unit 48. Based on the remaining capacity of the secondary battery 28, the charge control unit 42 instructs charging of the secondary battery 28 in a charging area or charging of the secondary battery 28 during traveling. Further, the battery life control unit 48 instructs to perform maintenance operation in the maintenance bay route, and which overhead traveling vehicle 16 requires maintenance and what kind of maintenance operation should be performed for the secondary battery of the overhead traveling vehicle 16 are displayed on a monitor of the ground controller 20 for allowing an operator to perform the maintenance operation. A charging power supply control unit 46 starts or stop supply of electricity to the non-contact electricity feeding lines 14 provided in straight segments of the routes 4, 6.

Figure 5:
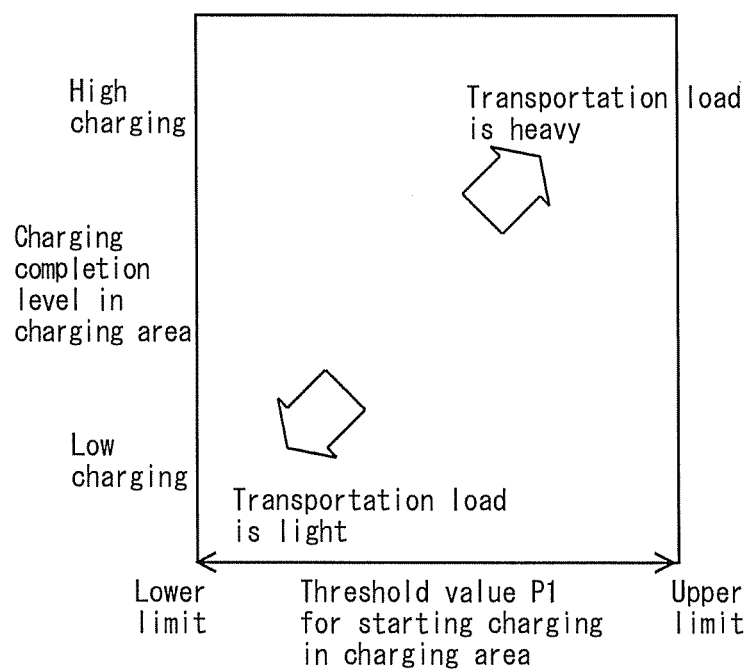

FIG. 5 shows a rule of charge control. Degree of transportation load is one parameter indicating a state of the entire overhead transportation vehicle system 2. For example, this parameter is an occurrence frequency of transportation instructions, or a prediction value of the occurrence frequency. If the transportation load is heavy, priority is given to transportation rather than charging in the charging bay route 8. If the transportation load is light, charging of overhead traveling vehicles 16 as many as possible is performed in advance in the charging bay route 8. In this manner, charging is performed when the transportation load is light to prepare for the period in which the transportation load is heavy. For this purpose, when the transportation load is heavy, the threshold value P1 for starting charging in the charging bay route (charging area) is reduced to, e.g., the lower limit of about 20%. When the transportation load is light, the threshold value P1 for starting charging is increased to, e.g., the upper limit of about 40%. Charging in the charging area is finished when, e.g., the remaining capacity is 100%. The vehicle placement control unit 44 can allocate the overhead traveling vehicles 16 with the remaining capacity having a predetermined value or more, e.g., 60% or more, 80% or more or the like. Therefore, when the transportation load is heavy, even if the charging level is relatively low, allocation of the overhead traveling vehicle 16 is performed, and when the transportation load is light, charging of the overhead traveling vehicle 16 is performed up to 100%.

Figure 6:
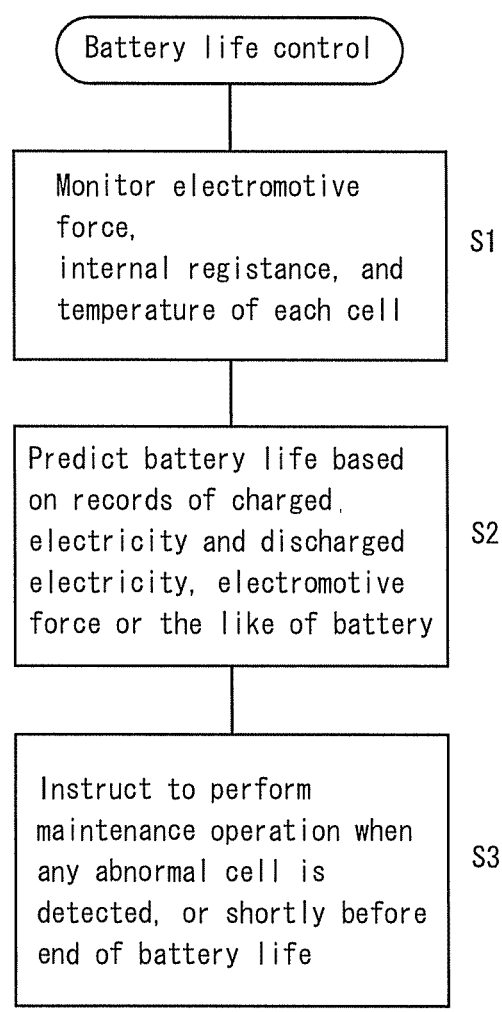

FIG. 6 is a diagram showing an algorithm for monitoring battery life. In step 1, electromotive force, internal resistance, and temperature or the like of each single cell are monitored, and any single cell or cell unit having a failure is detected. In step 2, change in the maximum capacity of the battery is detected based on the records of charged electricity and discharged electricity, electromotive force, internal resistance, temperature or the like of the battery. If a failure occurs in a single cell or a cell unit, or if the maximum capacity of the battery as a whole becomes low, the overhead traveling vehicle 16 is instructed to travel to the maintenance bay route 10 to receive maintenance operation.

In the embodiment, the following advantages are obtained.

(1) Problems in connection with charging of the secondary battery, and waiting and allocation of the overhead traveling vehicle are solved together.

(2) Since charging is performed in the charging bay route 8, unlike the case where vehicles stop in the routes 4, 6 for charging, no traffic jam occurs. Further, once charging is started, it continues until sufficient amount of electricity is charged, and the battery capacity becomes high efficiently.

(3) Since non-contact electricity feeding lines 14 are also provided in straight segments of the normal routes 4, 6, charging can be performed while the overhead traveling vehicle 16 is traveling. Further, even if shortage of electricity in the battery occurs, the overhead traveling vehicle 16 is assisted to travel to the charging bay route. It is sufficient to provide the non-contact electricity feeding lines 14 only in the straight segments, and only in the segments where a large number of overhead traveling vehicles 16 travel.

(4) The state of the secondary battery 28 is monitored for each of the single cells or each of the cell units, and the change in the maximum capacity of the secondary battery is monitored as well. In this manner, maintenance operation can be performed suitably, and it is ensured that all of the overhead traveling vehicles can travel continuously without running out of electricity in the battery.

While, in the embodiment, non-contact electricity feeding line 14 is used for charging the secondary battery, contact type chargers may be provided on the ground, and a charging coupler may be provided on the overhead traveling vehicle. In this case, the overhead traveling vehicle is stopped, and the charging coupler is connected to the charger for charging the secondary battery. The contact type charger is advantageous in that large electrical current can be used for charging in comparison with non-contact electricity feeding. However, if the charger is provided, since the overhead traveling vehicles 16 are moved forward to reduce the inter-vehicle distance for space saving, charging needs to be interrupted frequently. Further, if the charging coupler is provided in the routes 4, 6, the overhead traveling vehicles 16 stop for charging in the routes 4, 6, and traffic jams may occur.

Figure 7:
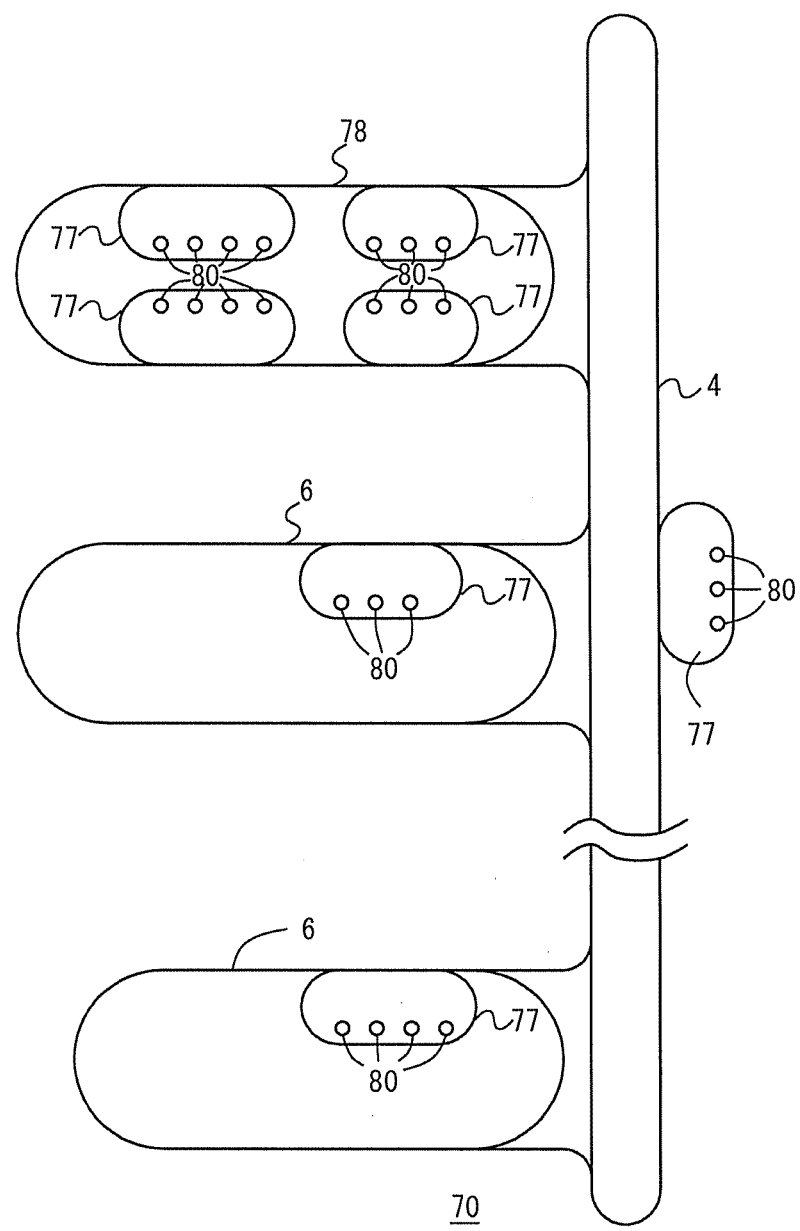

FIG. 7 shows an overhead traveling vehicle system 70 in a modified embodiment; it is the same as the overhead traveling system shown in FIGS. 1 to 6, excepts the points particularly specified, and description of the overhead traveling vehicle 16, the ground controller 20 or the like is omitted. Instead of providing the dedicated charging bay route 8, a large number of charging routes 77 are provided. Each of the charging routes 77 has both ends connected to the inter-bay route 4 or the intra-bay routes 6, 78 to form a loop, and a large number of chargers 80 are provided in it. The charging route 77 may be provided inside the routes 4 and 6 or outside the routes 4 and 6. A contact type charging coupler is provided in the overhead traveling vehicle 16. An intra-bay route 78 having larger number of charging route 77 than other routes 4 and 6 is used as the charging bay route 8 in the embodiment. It should be noted that the intra-bay route 78 is also used as the intra-bay route having normal load ports or the like. In this manner, even in the case where no dedicated charging routes 8 are provided, the intra-bay route can have the function of the charging route 8 as well.

If the remaining battery capacity is lowered to the threshold value or less, charging is basically carried out in the intra-bay route 78. Since a large number of charging routes 77 are present in the route 78, an overhead traveling vehicle having the greatest charge among those at front positions in the routes 77 returns to work. In a route 77 having an empty space, charging of a new overhead traveling vehicle is started. Further, when the new overhead traveling vehicle enters the route 77, the stop positions are changed towards forwarding chargers 80. The intra-bay route 78 is also used as waiting space for the overhead traveling vehicles.

The charging routes 77 in the routes 4, 6 are used as the waiting space for the overhead traveling vehicles regardless of the amount of charging capacity. Further, when an overhead traveling vehicle 16 requires charging, the ground controller 20 issues an instruction to move another overhead traveling vehicle which is currently being charged out of the charging route 77 to make an empty charger.

Description of the Numerals
2, 70: overhead traveling vehicle system
4: inter-bay route
6, 78: intra-bay route
8: charging bay route
9: route
10: maintenance bay route
12: short cut
14: non-contact electricity feeding line
16: overhead traveling vehicle
20: ground controller
22: on board controller
24: travel unit
26: transfer unit
28: secondary battery
30: battery control unit
32: charger
34: position sensor
36: inverter
40: transportation instruction control unit
42: charge control unit
44: vehicle placement control unit
46: charging power supply control unit
48: battery life control unit
50: transportation instruction file
52: vehicle status file
54: battery record file
60: travel motor
61: transfer system motor
63: power supply
77: charging route
80: charger

What is claimed is:

1. A transportation vehicle system for running a plurality of transportation vehicles having an energy storage member as a power supply under control of a ground controller along a predetermined travel route, wherein
   a charging area having charging equipment for the energy storage member of the transportation vehicles is provided in the travel route,
   the transportation vehicles have means for reporting positions and remaining capacities to the ground controller, and
   the ground controller has a charge control unit controlling the transportation vehicles having the remaining capacities of the energy storage member not more than a threshold value to travel to the charging area for charging the energy storage members and a vehicle placement control unit for controlling the transportation vehicles in the charging area to travel to positions outside the charging area.

2. The transportation vehicle system according to claim 1, wherein the charge control unit makes the threshold larger for the transportation vehicles remote from the charging area and makes the threshold smaller for the transportation vehicles near from the charging area.

3. The transportation vehicle system according to claim 1, wherein the energy storage member comprises a secondary battery comprising single cells or cell units connected in series, wherein the transportation vehicles are overhead traveling vehicles configured to report electromotive forces and internal resistances of each single cell or each cell unit, and amounts of charge and discharge and the remaining capacity of the secondary battery to the ground controller; and
   wherein the ground controller detects an overhead traveling vehicle having a secondary battery that requires maintenance.

4. The transportation vehicle system according to claim 3, wherein the charging equipment comprising non-contact electricity feeding lines and power supplies for the non-contact electricity feeding lines, provided in the charging area and in straight segments in the travel route outside the charging area,
   wherein the overhead traveling vehicles charge the secondary battery in the charging area when the remaining capacity of the secondary battery is the threshold value or less,
   and wherein the traveling vehicles charge the secondary battery in the straight segments outside the charging area when the remaining capacity of the secondary battery is the threshold value or more.

5. The transportation vehicle system according to claim 3, wherein the overhead traveling vehicles have means for charging the secondary battery with regenerative electricity from a travel motor.

6. The transportation vehicle system according to claim 3, wherein the ground controller reduces the threshold value when occurrence frequency of transportation instructions is relatively high, and increases the threshold value when occurrence frequency of transportation instructions is relatively low.

* * * * *